US005606988A

United States Patent [19]

Pawlowski, Jr.

[11] Patent Number: 5,606,988

[45] Date of Patent: Mar. 4, 1997

[54] CONNECTOR ASSEMBLY FOR INK CARTRIDGE

[75] Inventor: Norman E. Pawlowski, Jr., Corvallis, Oreg.

[73] Assignee: Hewlett -Packard Company, Palo Alto, Calif.

[21] Appl. No.: 192,083

[22] Filed: Feb. 4, 1994

[51] Int. Cl.[6] ..... F16L 29/00

[52] U.S. Cl. ..... 137/68.14; 251/149.1; 251/149.6

[58] Field of Search ..... 251/149.6, 149.7, 251/149.1; 137/68.14, 68.29, 68.3, 614.11

[56] References Cited

U.S. PATENT DOCUMENTS

| | | | |
|---|---|---|---|
| 2,618,978 | 11/1952 | Ragland | 251/149.7 X |
| 2,630,131 | 3/1953 | Snyder | 251/149.7 X |
| 3,296,624 | 11/1964 | Ascoli . | |
| 4,383,263 | 5/1983 | Ozawa et al. . | |
| 4,422,084 | 12/1983 | Saito . | |
| 4,429,320 | 1/1984 | Hattori et al. . | |
| 4,436,125 | 3/1984 | Blenkush | 251/149.6 X |
| 4,475,116 | 10/1984 | Sicking et al. . | |
| 4,496,959 | 1/1985 | Frerichs . | |
| 4,530,421 | 7/1985 | Balch | 251/149.6 X |
| 4,677,447 | 6/1987 | Nielsen . | |
| 4,700,744 | 10/1987 | Rutter et al. | 251/149.6 X |
| 4,714,937 | 12/1987 | Kaplinsky . | |
| 4,831,389 | 5/1989 | Chan . | |
| 4,849,773 | 7/1989 | Owatari . | |
| 4,928,126 | 5/1990 | Asai . | |
| 4,931,812 | 6/1990 | Dunn et al. . | |
| 4,935,751 | 6/1990 | Hamlin . | |
| 4,959,667 | 9/1990 | Kaplinsky . | |
| 4,999,652 | 3/1991 | Chan . | |

*Primary Examiner*—John C. Fox

[57] ABSTRACT

The connector assembly provides leak protection to enable the disconnection of a filled or partially filled ink cartridge from an ink-jet printer without leaking ink. The connector assembly includes a valve assembly having a fitment and a valve attached thereto. The valve is movable to close a passageway formed through the fitment when the ink cartridge is disconnected from a coupler connected to the printer. The coupler may be used to open the valve to permit ink flow from the ink cartridge to the printer.

19 Claims, 2 Drawing Sheets

CONNECTOR ASSEMBLY FOR INK CARTRIDGE

TECHNICAL FIELD

The present invention is directed to a connector assembly for conducting ink to and from a supply cartridge.

BACKGROUND AND SUMMARY OF THE INVENTION

An ink-jet printer includes a pen for selectively ejecting ink drops to produce characters or images on a sheet of paper. The pen has a reservoir for holding a limited amount of ink. A relatively large supply of ink is provided in a stationary cartridge that is mounted to the printer. A tube conducts ink flow from the ink cartridge to the pen for replenishing the pen reservoir as needed.

When the ink cartridge has been depleted of ink, it is replaced or refilled. Sometimes, it is necessary to disconnect a partially filled or filled ink cartridge from the tube. For example, it may be desirable to remove a partially filled cartridge before a large print job and replace it with a filled cartridge to prevent interruptions during printing due to insufficient ink supply. It may be difficult to disconnect partially filled or filled ink cartridges without leaking ink from the cartridge.

Some ink cartridges are constructed to be collapsed, i.e., the volume of the cartridge is reduced, as ink is withdrawn from the ink cartridge by the pen. Collapsible ink cartridges may be overfilled during refilling because certain portions of the ink cartridge are permanently deformed when the cartridge is collapsed. The permanent deformation prevents the ink cartridge from returning to its original size when refilled with ink. Accordingly, attempting to refill the deformed cartridge with the same volume of ink as originally held may cause the ink to overflow and expose the user to free ink.

The present invention is directed to a connector assembly that facilitates convenient disconnection of a filled or partially filled ink cartridge from a pen reservoir. The connector assembly includes a valve assembly having a fitment for connecting the ink cartridge to a coupler that is in fluid communication with a pen reservoir. The valve assembly has a central passageway formed therethrough and includes a valve movable between a closed position for occluding the passageway and an open position to open the passageway. The coupler is insertable into the passageway for moving the valve from the closed to the open position to permit ink flow through the passageway. An aperture is formed through the coupler so that ink may flow from the ink cartridge to the print head.

The valve is biased into the closed position when the ink cartridge is disconnected, thereby to prevent spillage of ink. The connector assembly also includes a spherical stopper for obstructing the central passageway of the fitment to provide extra protection against leaks.

As another aspect of this invention, the connector assembly and ink cartridge are made of a recyclable material.

DESCRIPTION OF PREFERRED EMBODIMENTS

Figure 1:
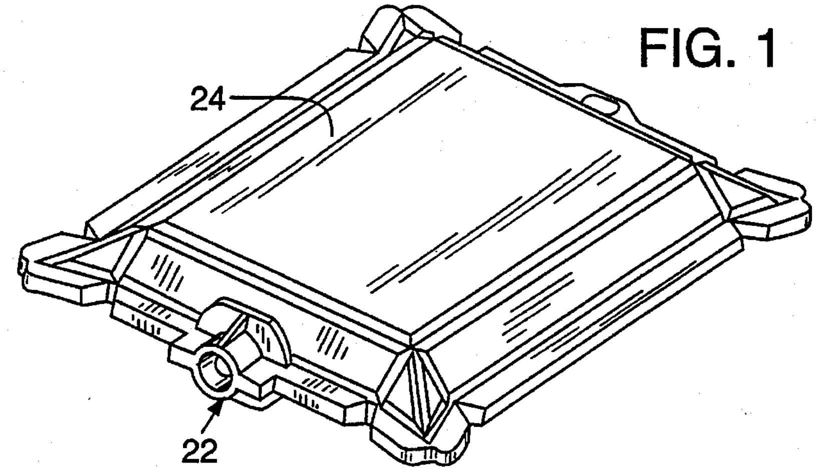
FIG. 1 is a perspective view of a cartridge employing one embodiment of a valve assembly of the present invention.

With reference to FIGS. 1–4, a connector assembly 20 of the present invention includes a valve assembly 22 and an elongated coupler 26 to permit extraction of ink from a supply container, such as an ink cartridge 24, when the coupler 26 and valve assembly 22 are connected. The coupler may also be connected to a tube leading to the reservoir of an ink-jet pen (not shown) so that ink may be conveyed from ink cartridge 24 to the pen. Connector assembly 20 enables a filled or partially filled ink cartridge 24 to be removed from coupler 26 without ink leakage.

Ink cartridge 24 may be made from any of a variety of materials including, but not limited to, polymer, metal, glass and paper based materials. One preferred embodiment of cartridge 24 is made of a recyclable material such as high density polyethylene. Other recyclable and non-recyclable materials, or combinations thereof may be used. Cartridge 24 is preferably, but not necessarily, collapsible so that the cartridge is gradually collapsed as the cartridge is depleted of ink.

The valve assembly 22 includes a fitment 23 and valve 40. The fitment 23 includes a central bore or passageway 28 through which ink may pass from the container 24. The fitment 23 is integrally formed with the cartridge 24 so that ink contained in the cartridge may be discharged through the fitment 23 without any leakage between the fitment and cartridge 24. Alternatively, fitment 23 may be a separate body that is operatively attached to cartridge 24 to provide a seal therebetween that is impermeable to ink.

The fitment passageway 28 has an inlet end 30 and an outlet end 32. The ends 30, 32 have chamfered seats 34, 36 respectively. The passageway may be constructed without chamfered seats.

The valve 40 is movable between a closed position (FIG. 3) for occluding the passageway 28 and an open position (FIG. 4) to open the passageway 28. Valve 40 includes a cone shaped plug 42 and a connected biasing member, such as a resilient spring 44. Spring 44 is generally disk-shaped, and has apertures 52 formed through it to permit ink to flow through the spring. Preferably, spring 44 is sealingly attached to an inside wall 53 of cartridge 24 or fitment 23 to prevent undesirable leakage. The spring normally biases plug 42 toward the closed position.

Plug 42 is preferably, but not necessarily, integrally formed with spring 44 to protrude from a center 46 of one side of the spring. The plug and the spring may be made of an elastic material such as rubber, plastic or any other resilient material that seals well against the passageway 28. Alternatively, plug 42 may be separately formed and attached to the center 46 of the spring by fastening means such as adhesives or mechanical fasteners.

Figure 4:
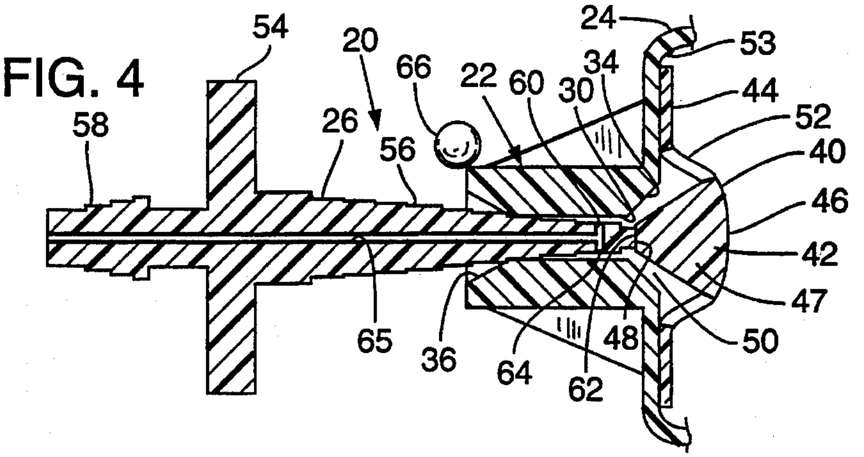
FIG. 4 is a sectional view like FIG. 3 but showing the components connected.

Plug 42 has a conical projection 47 terminating at a flat bottom contact surface 48. The projection rests against chamfered seat 34 when valve 40 is in the closed position to occlude inlet end 30 of passageway 28. Plug 42 is in the open position when the plug is moved away from chamfered seat 34 so that the plug is spaced apart from seat 34 and a generally annular void 50 is formed between plug 42, and fitment 23 (FIG. 4). In the open position, therefore, a continuous liquid path exits from the container interior, through spring apertures 52, void 50, and to passageway 28.

Coupler 26 may be made of any of a variety of materials including, but not limited to, metal, polymer and ceramics. The illustrated embodiment of the coupler is made of a polymer such as polyethylene. However, other materials such as stainless steel and ceramics may be used. Coupler 26 is elongated and includes an annular handle member 54 having a valve opener portion 56 extending from one side and tub connector portion 58 extending from the other side.

The tube connector portion 58 may be used for connecting coupler 26 to a tube or other conduit that connects with the pen (not shown). Valve opener portion 56 may be tapered in stepped fashion as shown, or in a continuous manner. Valve opener portion 56 has an end tip 60 that is sufficiently narrow to be insertable into fitment passageway 28. End tip 60 terminates at a transverse end surface 62 that abuts contact surface 48 of plug 42 when valve opener portion 56 is inserted for a sufficient distance into fitment passageway 28. Insertion of portion 56 displaces the plug 42 to open the valve 40. The shape of the tapered valve opener portion 56 limits the distance into which the portion 56 may be inserted, thereby to prevent end tip 60 from pushing the plug 42 too far away from chamfered seat 34, which may break the spring 44. When the tube connector portion is fully inserted, the fit of the connector and fitment provides a fluid-tight seal between those components. Moreover, the resilience of the polyethylene fitment provides this sealing effect without the need for a gasket. Consequently, the outlet end 32 (and inlet end 30) of the fitment define an integral, annular seal for leak-free sealing against a component, such as the coupler 26, that is inserted therein.

A common central aperture 65 extends completely through the tube connector portion 58 and opener portion 56 to the tip 60 at the valve opener portion 56. Adjacent end tip 60 is a transverse aperture 64 formed to be in fluid communication with the end of central aperture 65. Accordingly, ink may flow through apertures 64, 65 from end tip 60 through coupler 26 and exit at tube connector portion 58.

A breakable septum 38 extends across passageway 28 of the fitment between inlet end 30 and outlet end 32 to provide leak protection, such as during shipping of the cartridge. Specifically, the septum provides redundant leak protection with the normally closed valve 40. Septum 38 is preferably made of a material that is strong enough to prevent ink from flowing through passageway 28, yet sufficiently fragile to break when coupler 26 is inserted into passageway 28 to pierce the septum.

The valve assembly 22 may include a removable spherical shaped stopper 66 for tightly stopping the passageway 28 to ensure the passageway remains occluded. The stopper 66 may be integrally formed with fitment 23. In the preferred embodiment, stopper 66 is heat welded or heat staked to an edge of fitment 23 adjacent the outlet end 32 of passageway 28. The stopper is easily removed from fitment 23 and may be inserted in passageway 28 to obstruct the passageway after coupler 26 is removed therefrom. For example, stopper 66 may provide leak protection when coupler 26 is removed from passageway 28 after septum 38 has been broken. Stopper 66 may be made of a material different from the material used for the fitment and the stopper may be attached to or supported by a structure independent of fitment 23.

Figure 5:
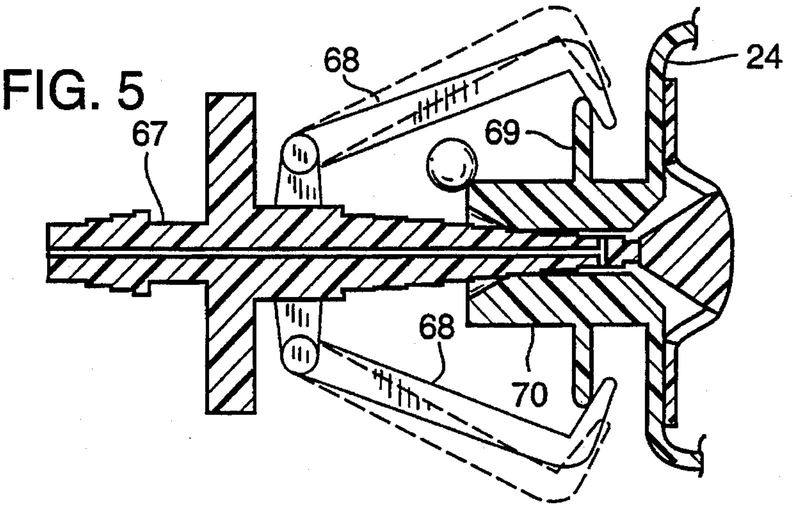
FIG. 5 is a sectional view of an alternate embodiment of a connector assembly.

In an alternative embodiment of the coupler and fitment, as illustrated in FIG. 5, a coupler 67 includes a holding mechanism such as hinge-supported latches 68 for holding coupler 67 to an annular flange 69 of a fitment 70. The latches ensure a seal-tight connection between coupler 67 and fitment 70. Coupler 67 may be released from fitment 70 by disengaging latch 68 (dashed lines) from annual flange 69.

Figure 6:
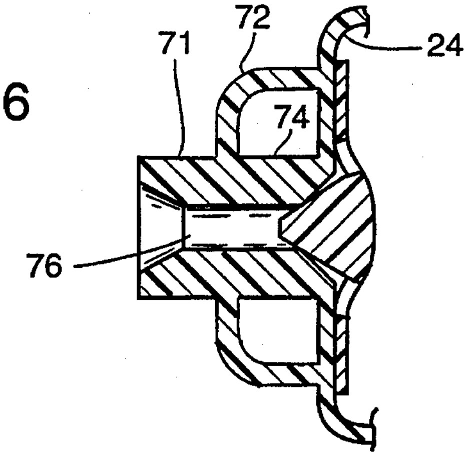
FIG. 6 is a sectional view of another embodiment of a connector assembly.

FIG. 6 shows an alternative fitment 71 having an annular reinforcing element 72 extending between a mid-portion 74 and ink cartridge 24. Reinforcing member 72 reinforces fitment 71 and reduces the risk of fitment 71 breaking when the coupler is inserted and removed from a passageway 76 formed through fitment 71.

Figure 8:
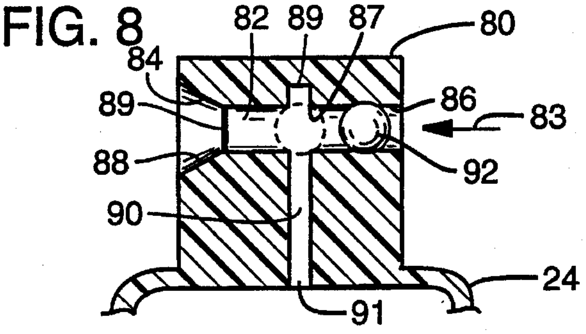
FIG. 8 is a sectional view of still another embodiment of a connector assembly.

FIG. 8 shows an alternative fitment 80 having a transverse aperture 82 extending therethrough. Transverse aperture 82 has an outlet end portion 84 and an opposite stopper retaining end portion 86. Outlet end portion 84 has an outwardly chamfered portion 88 adapted to permit coupler 26 to be inserted a predetermined distance into transverse aperture 82. Outlet end portion 84 may have a breakable septum 89 extending across the transverse aperture to prevent accidental leakage of ink from the cartridge. As described above, the septum is pierced when coupler 26 is inserted into transverse aperture 82.

Stopper retaining portion 86 is dimensioned to sealingly hold a movable stopper 92 to prevent ink from flowing through stopper retaining end portion 86. Stopper 92 is preferably made of a polymer such as high density polyethylene.

Figure 2:
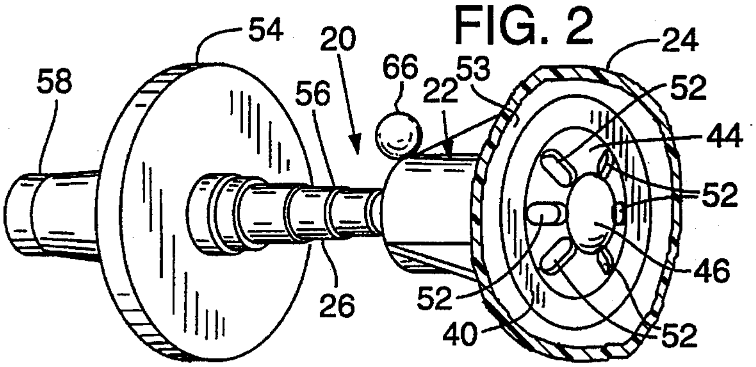
FIG. 2 is an enlarged perspective view of the primary components of a connector assembly.
Figure 3:
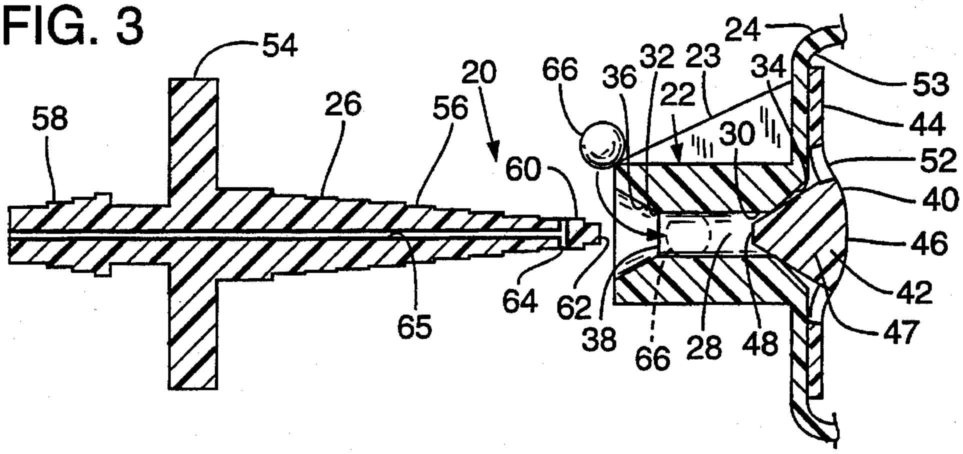
FIG. 3 is a sectional side view of components illustrated in FIG. 2, showing the components disconnected.

A central portion 87 of transverse aperture 82 is disposed between end portions 84, 86 and has a pocket 89 formed therein. A central longitudinal aperture 90 is formed within fitment 80 and is substantially perpendicular to transverse aperture 82. Central aperture 90 intersects, and is in fluid communication with, aperture 82 at central portion 87. The aperture 90 has and an inlet portion 91 adjacent cartridge 24 so that ink may flow from the cartridge in through inlet portion 91 of central aperture 90 and out through outlet end portion 84. The fitment 80 is adapted for use with a valve, such as valve 40 (FIG. 2).

When coupler 26 is withdrawn from aperture 82, stopper 92 may be moved, such as by pushing the stopper from end portion 86 as indicated by an arrow 83, to rest between pocket 89 and central aperture 90 to plug central aperture 90. To re-open aperture 90, the stopper may be pushed back into end portion 86.

Figure 7:
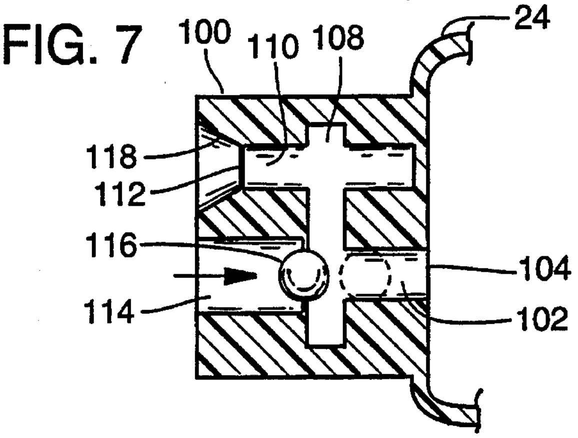
FIG. 7 is a sectional view of yet another embodiment of a connector assembly.

FIG. 7 illustrates an alternative fitment 100 having a longitudinal passageway 102 extending between an inlet end 104 of cartridge 24 and a transverse elongated chamber 108 defined within fitment 100. The fitment also has an off-center outlet passageway 110 formed therein in fluid communication with chamber 108 so that fluid may flow from cartridge 24 through passageway 102 and chamber 108 and be discharged through outlet passageway 110. The fitment 100 is adapted for use with a valve, such as valve 40 (FIG. 2).

Outlet passageway 110 may have an outwardly tapered end portion 118 that permits the tapered coupler 26 to be inserted a pre-determined distance until the coupler seals the inlet passageway. Outlet passageway 110 may include a breakable septum 112, similar to the septum described above. Fitment 100 also defines a stopper-holding aperture 114 that is concentric with passageway 102 for holding a removable stopper 116 that is integrally molded with the fitment, or heat staked therein. Stopper 116 may be, alternatively, attached within central aperture 114 by an adhesive or mechanical fastener.

Central aperture 114 is preferably aligned to intersect with central inlet passageway 102 so that stopper 116 may be inserted into inlet passageway 102 by pushing stopper 116 across chamber 108 into inlet passageway 102. In the illustrated embodiment, the stopper may be pushed into central inlet passageway 102 without first removing coupler 26 from outlet passageway 110.

While the present invention has been described in accordance with preferred and alternative embodiments, it is to be understood that various substitutions and alterations may be made thereto without departing from the spirit and scope of the appended claims.

I claim:

1. A connector assembly comprising:

a valve assembly including a fitment and a valve attached thereto, the fitment having a passageway formed therethrough, the valve being movable between a closed position for occluding the passageway and an open position for opening the passageway, the fitment including a septum for occluding the passageway; and a coupler insertable into the passageway for piercing the septum and moving the valve from the closed to the open position to permit liquid flow through the passageway, the coupler having an aperture formed therethrough and configured to be in fluid communication with the passageway when the coupler is inserted into the passageway.

2. A connector assembly according to claim 1 wherein the valve includes a movable plug connected to a biasing member to bias the plug into position for occluding the passageway.

3. A connector assembly according to claim 2 wherein the biasing member is a resilient member integrally formed with the plug.

4. An assembly according to claim 3 wherein the biasing member is disk-shaped and has apertures formed therein to permit liquid flow through the biasing member and into the passageway.

5. A connector assembly according to claim 2 wherein the fitment includes a chamfered seat in contact with the plug when the plug is in the closed position for occluding the passageway.

6. A connector assembly according to claim 1 wherein the coupler includes an elongated, tapered member having a tip end and wherein the aperture opens to the passageway at a location spaced from the tip end, the valve being movable into the open position by contact with the tip end of the inserted coupler.

7. A connector assembly according to claim 1 wherein the coupler is dimensioned to be inserted a predetermined distance into the passageway.

8. A connector assembly according to claim 6 wherein the coupler is shaped to provide a fluid-tight seal between the coupler and fitment when the coupler is inserted into the passageway.

9. A connector assembly according to claim 1 wherein the fitment is integrally formed with a container for containing a liquid.

10. A connector assembly according to claim 9 wherein the container and connector assembly are solely made of recyclable plastic material.

11. A connector assembly comprising:

a valve assembly including a fitment having a valve attached thereto, the fitment having a passageway formed therethrough, the valve being movable between a closed position for occluding the passageway and an open position for opening the passageway;

a coupler insertable into the passageway for moving the valve from the closed to the open position to permit liquid flow through the passageway; and a stopper carried by the fitment while the coupler is inserted into the passageway, the stopper being insertable into the passageway when the coupler is removed from the passageway, thereby to stop liquid flow through the passageway.

12. An assembly according to claim 11 wherein the stopper is attached to the fitment away from the passageway and detachable therefrom for insertion into the passageway.

13. An assembly according to claim 11 wherein the stopper is carried in an aperture that intersects the passageway so that the stopper is movable through the aperture into the passageway.

14. An assembly according to claim 11 wherein the fitment has a pierceable septum for occluding the passageway.

15. An assembly according to claim 11 including a latch mechanism movably attached thereto for holding the coupler to the fitment.

16. A connector assembly for a liquid-carrying container, comprising:

a valve assembly having a fitment attachable to the container, the fitment having a passageway formed therethrough to provide a path for liquid flow out of the container;

a spring biased plug member attached to the fitment and normally urged into a position for closing the passageway and movable into an open position for opening the passageway;

a pierceable septum attached to occlude the passageway; and a stopper mounted within an aperture in the fitment and movable into the passageway.

17. The assembly of claim 16 further comprising a coupler configured for piercing the septum and moving the plug member into the open position.

18. The assembly of claim 17 further comprising latch means for latching together the valve assembly and the coupler with the coupler inserted into the passageway.

19. The assembly of claim 16 wherein the fitment defines an aperture for carrying the stopper near the passageway.

* * * * *